March 6, 1934.   A. LOHMANN   1,950,149
DRIVING GEAR
Filed March 19, 1931
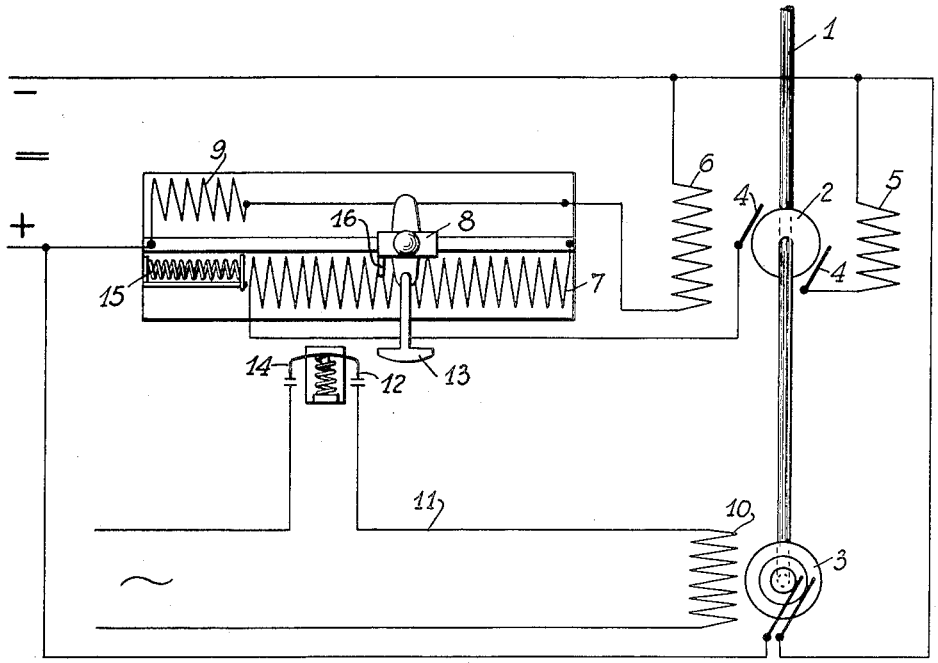
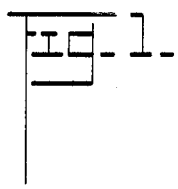
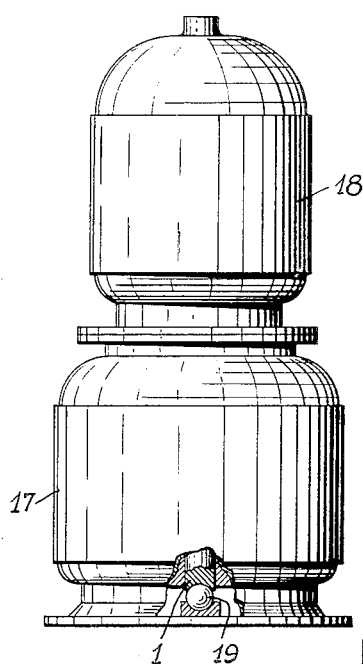
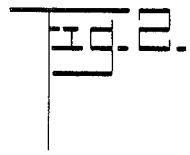
INVENTOR.
ADALBERT LOHMANN.
BY
ATTORNEYS Patented Mar. 6, 1934

1,950,149

UNITED STATES PATENT OFFICE 1,950,149

DRIVING GEAR

Adalbert Lohmann, Berlin-Wilmersdorf, Germany, assignor to the firm, Universum Film Aktiengesellschaft, Berlin, Germany Application March 19, 1931, Serial No. 523,686
In Germany April 7, 1930

5 Claims. (Cl. 172—293)

My invention relates to a drive, particularly for devices for the synchronization of sound and picture films for which, on the one hand, a certain normal working speed is prescribed, and in which, it is also desired to have the possibility of running the devices referred to, in the course of their regular operation, at substantially lower or higher speeds. This situation presents itself, for instance, in the case of devices for the synchronization of sound and picture films, where on the one hand, the normal speed (24 pictures per second) is required, particularly for testing the auditive reception of the sound film, and in which, it is also desirable to cause the films, particularly the picture film, to pass slowly before the vision of the tester, to enable him to check the same; finally, it may also be desirable, for the purpose of rapid re-rolling of certain parts which have already been tested, or for the rolling back of such parts of films which require re-checking, to be able to increase the running speed up to the maximum permissible limit, in order to avoid unnecessary loss of time.

The drive forming the subject-matter of the present invention fully satisfies these requirements. The object of the invention consists, substantially, in providing in the drive, a regulating device for the regulation of the number of revolutions, which device enables the number of revolutions to be increased and diminished between wide limits, while maintaining a predetermined speed which corresponds to the normal reeling-off speed of films. For example, such a drive may be secured by mechanical coupling with a speed regulator which latter comes into effective operation only when the device is operating at normal speed. A particularly simple embodiment of such a drive is secured if a direct current motor, the speed of which can be regulated within wide limits, (e. g. a compound motor,) and an alternating current motor running at a given speed (e. g. a reactance motor), or a three-phase synchronous motor, are used as driving means, both motors being connected to the same shaft, and the closing of the circuit of the alternating current motor is effected by means of the regulating slide in a range of speed, in which the number of revolutions per minute of the direct-current motor approximately corresponds to the normal number of revolutions per minute. With such an arrangement, the speed regulation of the direct-current motor, if the latter is designed as a compound motor, is preferably effected, in the lower ranges, by means of a regulating resistance connected in series with the series coil, and for the higher ranges of speed it is desirable to provide for the weakening of the shunt exciting field by means of a regulating resistance inserted in the shunt circuit. It will be found advantageous to combine the regulating resistances and the devices for putting the alternating current in circuit so that they should form a single combined set of equipment, so as to enable the various speeds to be adjusted in uninterrupted sequence by means of a single regulating slide. A special mark or a catch device should in this case be provided for the normal working speed, at which, as previously stated, the alternating current motor is in circuit.

The drawing illustrates an example of the wiring and the construction of the device.

Fig. 1 is a diagram of connections, with the regulating device, and

Fig. 2 is an outside view of a combined motor.

According to Fig. 1 the direct current motor 2 and the alternating current motor 3 drive the common driving shaft 1.

The armatures of both motors are fed by means of pairs of collector brushes 4. The field of the direct-current motor is produced by the series winding 5 as well as by the shunt winding 6.

The rheostat or regulating resistance 7 is connected in series with the direct-current motor; it serves, essentially, for securing the lower speeds by means of the regulating slide 8. The resistance 9 is connected in series with the shunt coil 6 and serves, in combination with the regulating slide 10, for securing high speeds by weakening the excitation of the magnetic field produced by the shunt winding 6.

The alternating-current motor 3 is operated in the alternating current field produced by winding 10 at a number of revolutions per minute which is determined by the frequency of the alternating current and by the number of poles of the motor. A switch 12 inserted into the conductor 11 leading to this winding, can be operated by the regulating slide 8 and is put in circuit only in that range of speed, in which the number of revolutions of the direct-current motor approximately corresponds to that of the alternating current motor. In the example shown in the drawing this closing of the circuit is effected by means of the cam surfaces 13 and 14 on the slide and on the switch; any other switching device, however, particularly those switching devices in which the production of sparks is avoided, may be used for this purpose.

The arrangement operates in the following manner: As long as rheostat slide 8 is located at the extreme right-hand side of the regulating device, the alternating current motor 3 remains inoperative, and the direct-current motor 2 is operated with maximum series resistance inserted so that the drive is operated at the lowest speed. If the slide 8 is moved toward the left, the series resistance is first diminished, and the speed of the direct motor is correspondingly increased until closing the circuit of the alternating current motor 3 produces a fixed speed. In this position any differences of driving force between the two motors, which operate in combination are balanced, so that it is unnecessary to cut-out the direct current motor. If the movement of slide 8 towards the left is continued, the alternating current motor is again disconnected, the number of revolutions per minute is increased by the gradual further diminution of the series resistance 7 and finally, a further substantial increase of the speed is effected by the insertion of resistance 9 into the conductor leading to the shunt coil. To prevent this high speed being used during permanent operation, a compression spring 15 has been provided, which presses against the stop 16 provided on slide 8, so that the left-hand position of this slide is maintained only when the slide is kept in the position referred to by the operator's hand.

As shown in Fig. 2 both motors are combined into a single combined casing, so that the alternating current motor 3 is located in the lower casing 17, whilst the direct-current motor 2 is located in the upper casing 18; the two casings are mutually connected by means of flanges and bolts. Vertical bearings are provided for the common shaft 1 which is supported on ball-bearing 19 the latter taking up the axial thrust. Any other arrangement of the motors, however, as e. g. horizontal arrangement or separated casings for the two armatures etc. may be employed.

What I claim is:

1. Driving gear, particularly for devices for the synchronization of sound and picture films, comprising an electric switch arrangement with regulative sections, a synchronous motor for constant regulation of the normal speed of the sound film, connected to one regulative section of said arrangement, a speed motor, regulative in its speed within wide limits, rigidly joined with said synchronous motor and connected to another regulative section of said arrangement, means to connect both regulative sections of said electric arrangement in such a manner, that the introduction of the synchronous motor into the regulative section of the speed motor takes place at the moment, when the speed of the speed motor closely coincides with the speed of the synchronous motor and a regulating slide, forming part of said electrical arrangement, to first increase the speed of said speed motor through a decrease of electrical resistance, then to switch in the synchronous motor and after that to again disconnect said synchronous motor and switch in the least resistance for the highest speed of the speed motor.

2. Driving gear for sound and picture films, comprising a direct current motor and an alternating current motor, the rotors of which are coupled together, resistances connected in series with the main and shunt circuit of said direct current motor, a regulating slide operatable on said resistances, to vary the speed of said direct current motor, means to make or break the alternating current motor circuit with said regulating slide and spring operated means to oppose said slide from sliding on one of said resistances after the other resistance has been cut out from the direct current motor circuit.

3. Driving gear for sound and picture films, comprising a direct current motor and an alternating current motor, the rotors of which are coupled together, resistances connected in series with the main and shunt circuit of said direct current motor, a hand operated regulating slide operatable on said resistances, to vary the speed of said direct current motor, means to make or break the alternating current motor circuit with said regulating slide and means to push said slide from one of said resistances after the other resistance has been cut out from the direct current motor circuit and the hand operation has ceased.

4. A drive for use in the synchronization of sound and picture films, comprising a shaft, a direct current motor connected to said shaft, an alternating current motor adapted to operate at a predetermined speed and also connected to said shaft, said predetermined speed corresponding to the normal speed of said drive, a switch adapted to open and close the circuit of said alternating current motor, a series resistance in the circuit of said direct current motor, regulating means adapted to control said resistance so as to vary the speed of said motor, said regulating means being adapted to actuate said switch and to close the circuit of said alternating current motor when said direct current motor is running at substantially said normal speed.

5. A drive for use in the synchronization of sound and picture films, comprising a shaft, a direct current motor connected to said shaft, an alternating current motor adapted to operate at a predetermined speed, and also connected to said shaft, said predetermined speed corresponding to the normal speed of said drive, a switch adapted to open and close the circuit of said alternating current motor, a first series resistance in the armature circuit of said direct current motor, said direct current motor having a field which is provided with a shunt coil, a second series resistance in the circuit of said shunt coil, a movable member adapted to control both said resistances, said movable member being movable in a direction in which it cuts out a part of said first resistance in order to increase the speed of said direct current motor, said movable member being adapted to close said switch when said movable member is in a position in which the speed of said direct current motor is substantially the same as said normal speed, said movable member being then further movable in the same direction so as to release said switch and to then place said second resistance in the circuit of said shunt coil, said second series resistance being normally cut out of the circuit of said shunt coil by said movable member.

ADALBERT LOHMANN.